United States Patent Office 3,159,592
Patented Dec. 1, 1964

3,159,592
PRESSURE SENSITIVE TRANSFER MEMBER AND PRESSURE TRANSFERABLE INKS THEREFOR
John F. McHugh, Brooklyn, N.Y., and Harlan H. Nickell, California, Ky., assignors to Interchemical Corporation, New York, N.Y., a corporation
No Drawing. Filed Nov. 29, 1960, Ser. No. 72,308
7 Claims. (Cl. 260—23.7)

This invention relates to pressure transferable inks for a pressure sensitive transfer member of carbon paper and to pressure sensitive transfer members which have been coated with the pressure transferable inks.

Because conventional carbon papers composed of pigments in a wax base have several inherent disadvantages including excessive softening when subjected to higher temperatures causing stickiness, increased tackiness when pressure is applied and limitations as to the weight of the applied coating, there have been increased efforts in the art to produce transfer members without the disadvantage of the conventional members which have substantially a wax binder.

There has now been discovered a pressure transferable ink which when coated upon a conventional carbon paper substrate provides a novel pressure sensitive transfer member of carbon paper of greater durability than wax base carbon papers which never sticks to the copy sheet and which, during extended use, displays a uniform decrease in copy intensity; i.e., the impression on copies made from the carbon during extended use should show a gradual decrease in copy intensity. Further, these novel carbon papers may be coated with coatings having a greater weight or thickness than the wax based papers.

The novel pressure tranferable inks of this invention include a binder comprising a resin which may be a styrene-acrylonitrile copolymer or polyblend of a major amount of styrene polymer and a minor amount of a rubbery diene polymer or a combination of the styrene-acrylonitrile copolymer and the blend in a non-volatile, non-drying liquid plasticizer for the copolymer, said binder having coloring matter dispersed therein and a volatile organic solvent.

The styrene-acrylonitrile copolymers preferably used in this invention are described in U.S. Patent No. 2,739,142. However, other styrene-acrylonitrile copolymers such as "Styrone 475" marketed by Dow Chemical or "Bakelite 4511" marketed by Union Carbide Chemicals Corporation may also be used.

The polyblends of styrene polymers and rubbery dienes uesd in this invention are described in U.S. Patent 2,893,975. However, in the present invention, these polyblends are used alone without the dyes described in said patent. Preferably, we use a polyblend made in accordance with Example III of U.S. Patent 2,893,975.

The styrene-acrylonitrile copolymers may also be used in combination with methyl methacrylate.

Although the proportions of the resin are not critical, it preferably comprises 8 to 14% of the total ink weight.

As the non-volatile, non-drying liquid plasticizer for the styrene-acrylonitrile copolymer, a material is used that is not completely compatible with the copolymer. Typical of the non-volatile, non-drying liquid plasticizer that can be used in the inks is oleic acid, mineral oil, castor oil, triethylene glycol or combinations thereof. The plasticizer preferably constitutes 8.0% to 10.0% by weight of the ink.

The coloring matter used in this invention constitutes dyes and/or pigments. Any basic dye conventionally used in carbon paper compositions may be used. Preferred pigments include carbon black, flushed alkali blue, alkali blue, and iron blue. Preferred dyes include nigrosine base and Victoria blue base. The coloring matter preferably constitutes 8 to 17% of the total inks' weight.

The volatile organic solvent is preferably used in the amount of 60 to 70% by weight of the ink. Ketones such as methyl ethyl ketone, methyl isobutyl ketone and acetone are preferably used as solvents.

The transfer members of this invention preferably have coatings ranging from 0.5 to 0.7 mil in thickness when dry.

The following examples will illustrate the practice of this invention:

Example 1

| | Parts by weight |
|---|---|
| A. A polyblend in accordance with U.S. Patent 2,893,975 prepared by dissolving 6 parts by weight of a copolymer of 75% butadiene and 25% of styrene by weight in 94 parts of styrene monomer and subsequently polymerizing the monomer by conventional addition polymerization | 7.4 |
| B. Styrene acrylonitrile copolymer prepared in accordance with U.S. Patent 2,739,142 | 4.6 |
| C. Cornstarch | 4.0 |
| D. Oleic acid | 6.9 |
| E. Mineral oil | 5.9 |
| F. Victoria blue | 2.7 |
| G. Flushed alkali blue | 4.0 |
| H. Methyl violet | 0.3 |
| I. Methyl ethyl ketone | 64.2 |

A and B are dissolved in a major portion of I. A dispersion of C, F, G and H in D, E and the remainder of I is prepared and mixed with this solution using a ball mill to produce a mixture of uniform consistency. The mixture is then coated evenly at room temperature on a paper substrate by conventional techniques. The coated substrate is allowed to air dry. The coating hardens by evaporation of the volatile solvent to form a pressure sensitive transfer member having the superior properties of not sticking to the copy sheet and fading evenly during use rather than producing jagged and uneven copies after such use.

Examples 2–6

Example 1 is repeated using the following respective proportions by weight:

| | Ex. 2 | Ex. 3 | Ex. 4 | Ex. 5 | Ex. 6 |
|---|---|---|---|---|---|
| (A) Polyblend in accordance with U.S. Patent 2,893,975, described in Example 1 | 5.0 | 8.8 | 8.2 | 7.1 | 6.5 |
| (B) Styrene-Acrylonitrile Copolymer | 8.8 | 5.2 | 4.9 | 4.5 | 4.3 |
| (C) Corn Starch | 2.1 | 1.9 | 2.0 | 2.2 | 2.3 |
| (D) Oleic Acid | 8.3 | 7.5 | 7.9 | 8.6 | 8.8 |
| (E) Mineral Oil | 5.2 | 4.7 | 4.9 | 5.4 | 5.6 |
| (F) Victoria Blue | 2.9 | 2.6 | 2.7 | 2.8 | 3.1 |
| (G) Flushed Alkali Bule | 3.5 | 3.1 | 3.3 | 3.5 | 3.8 |
| (H) Methyl Violet | 0.6 | 0.5 | 0.5 | 0.5 | 0.6 |
| (I) Methyl Ethyl Ketone | 63.6 | 65.7 | 66.6 | 66.0 | 65.0 |

The transfer members produced had the same superior properties as those of Example 1.

Example 7

Example 1 is repeated using the following ingredients:

| | Parts by weight |
|---|---|
| A. Styrene acrylonitrile copolymer prepared in accordance with U.S. Patent 2,739,142 | 12.0 |
| B. Corn starch | 2.1 |
| C. Oleic acid | 8.3 |
| D. Mineral oil | 5.2 |
| E. Victoria blue | 2.9 |
| F. Flush alkali blue | 3.5 |
| G. Methyl violet | 0.6 |
| H. Methyl ethyl ketone | 65.4 |

The resulting transfer member has the same superior properties as the member produced in Example 1.

*Example 8*

Example 7 is repeated with the same ingredients and proportions except that a polyblend in accordance with U.S. Patent No. 2,893,975 prepared by dissolving 6 parts by weight of a copolymer of 75% butadiene and 25% of styrene in 94 parts of styrene monomer and polymerizing the monomers by conventional addition polymerization is used in place of the styrene acrylonitrile copolymer. The resulting transfer member displays the same superior properties as the member of Example 7.

*Example 9*

| | Parts by weight |
|---|---|
| A. A polyblend in accordance with U.S. Patent No. 2,893,975 described in Example 1 | 7.3 |
| B. Styrene-acrylonitrile copolymer prepared in accordance with U.S. Patent No. 2,739,142 | 4.7 |
| C. Mineral oil | 14.6 |
| D. Flushed alkali blue | 8.4 |
| E. Methyl ethyl ketone | 65.0 |

A and B are dissolved in a major portion of E. A dispersion of D and C and the remainder of E is prepared and mixed with the solution using a ball mill to produce a mixture of uniform consistency. The mixture is then coated evenly at room temperature on a paper substrate by conventional techniques. The coated substrate is allowed to air dry. The resulting transfer member displays the same superior properties as that of Example 1. In addition, the transfer member displays virtually no bleeding on standing for prolonged periods of time.

*Example 10*

Example 9 is repeated using the same ingredients and proportions except that peanut oil is substituted for mineral oil. The transfer member produced was equivalent to that of Example 9 in all its superior properties.

*Example 11*

Example 1 is repeated using the following ingredients:

| | Parts by weight |
|---|---|
| A. A polyblend in accordance with U.S. Patent No. 2,893,975 described in Example 1 | 7.3 |
| B. Methyl methacrylate | 2.3 |
| C. Corn starch | 2.1 |
| D. Oleic acid | 8.4 |
| E. Mineral oil | 5.3 |
| F. Victoria blue | 2.9 |
| G. Flushed alkali blue | 3.6 |
| H. Methyl violet | 0.6 |
| I. Methyl ethyl ketone | 67.5 |

The resulting transfer member displays the same superior properties as does the member of Example 1.

While the compositions of this invention are preferably used for pencil carbon paper, it will be obvious that they may also be used for typewriter carbon and "one-time" carbon paper.

It will be understood by those skilled in the art that intensity of the copies will vary with color concentration in the composition.

The above described examples and description are set forth by way of illustration only. Many other variations and modifications thereof will be apparent to those skilled in the art, and can be made without departing from the spirit and scope of the invention herein described.

What is claimed is:

1. A pressure sensitive transfer member comprising an impression transmitting supporting web having on one surface thereof an adherent film of pressure transferable coating comprising (A) 8 to 14 parts by weight of a resin comprising at least one member selected from the group consisting of (1) a blend including 94% of styrene homopolymer and 6% of a copolymer of styrene and butadiene and (2) the polymerization product of a mixture comprising by weight 20% to 35% of acrylonitrile, and 65% to 80% of styrene, (B) 8.0 to 17 parts by weight of a non-volatile composition comprising at least one member selected from the group consisting of oleic acid mineral oil, triethylene glycol and castor oil (C) coloring material.

2. A pressure transferable ink for a pressure sensitive transfer member comprising (A) 8 to 14 parts by weight of a resin comprising at least one member selected from the group consisting of (1) a blend including 94% of styrene homopolymer and 6% of a copolymer of styrene and butadiene and (2) the polymerization product of a mixture comprising by weight 20% to 35% of acrylonitrile, and 65% to 80% of styrene, (B) 8.0 to 17 parts by weight of a non-volatile composition comprising at least one member selected from the group consisting of oleic acid mineral oil, triethylene glycol and castor oil, (C) a volatile organic solvent for the resin and (D) coloring material.

3. The transfer member claimed in claim 1 wherein said resin comprises a blend including 94% of styrene homopolymer and 6% of a copolymer of styrene and butadiene and the polymerization product of a mixture comprising by weight 20% to 35% of acrylonitrile, and 65% to 80% of styrene.

4. The ink claimed in claim 2 wherein said resin comprises a blend including 94% of styrene homopolymer and 6% of a copolymer of styrene and butadiene and the polymerization product of a mixture comprising by weight 20% to 35% of acrylonitrile, and 65% to 80% of styrene.

5. The transfer member claimed in claim 1 wherein said resin comprises a blend including 94% of styrene homopolymer and 6% of styrene-butadiene copolymer and methyl methacrylate.

6. A pressure sensitive transfer member according to claim 1, wherein said selected member is the polymerization product of the styrene and the acrylonitrile.

7. An ink according to claim 2, wherein said selected member is the polymerization product of the styrene and acrylonitrile.

References Cited in the file of this patent

UNITED STATES PATENTS

| 2,589,306 | Steiner | Mar. 18, 1952 |
| 2,739,142 | Jones et al. | Mar. 20, 1956 |
| 2,893,975 | Popielski | July 7, 1959 |
| 2,989,493 | Clark et al. | June 20, 1961 |

FOREIGN PATENTS

| 516,975 | Germany | Jan. 29, 1931 |
| 518,272 | Germany | Feb. 14, 1931 |
| 518,274 | Germany | Feb. 14, 1931 |